US010018839B2

(12) United States Patent
Gotoda

(10) Patent No.: US 10,018,839 B2
(45) Date of Patent: Jul. 10, 2018

(54) DISPLAY DEVICE, HEAD-MOUNTED DISPLAY, DISPLAY METHOD, DISPLAY PROGRAM AND STORAGE MEDIUM

(75) Inventor: Akira Gotoda, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 150 days.

(21) Appl. No.: 14/404,826

(22) PCT Filed: May 30, 2012

(86) PCT No.: PCT/JP2012/063982
§ 371 (c)(1),
(2), (4) Date: Dec. 1, 2014

(87) PCT Pub. No.: WO2013/179424
PCT Pub. Date: Dec. 5, 2013

(65) Prior Publication Data
US 2015/0168716 A1   Jun. 18, 2015

(51) Int. Cl.
G09G 5/00 (2006.01)
G02B 27/01 (2006.01)
G02B 27/02 (2006.01)
G09G 5/10 (2006.01)
(Continued)

(52) U.S. Cl.
CPC ............ G02B 27/01 (2013.01); G02B 27/02 (2013.01); G06F 3/013 (2013.01); G09G 5/00 (2013.01); G09G 5/10 (2013.01); G09G 5/36 (2013.01); G09G 2340/14 (2013.01); G09G 2354/00 (2013.01)

(58) Field of Classification Search
CPC ......... G02B 27/01; G02B 27/02; G06F 3/013; G09G 5/00; G09G 5/10; G09G 5/36; G09G 2340/14; G09G 2354/00
See application file for complete search history.

(56) References Cited

U.S. PATENT DOCUMENTS 8,970,453 B2 * 3/2015 Sasaki ................ G01C 21/365
340/461
2008/0062297 A1 3/2008 Sako et al.
(Continued)

FOREIGN PATENT DOCUMENTS

JP 2002-090688 3/2002
JP 2004-219664 8/2004
(Continued)

OTHER PUBLICATIONS

PCT/JP2010/007081, Sasaki, Jun. 16, 2011.*
International Search Report, PCT/JP2012/063982, dated Jul. 17, 2012.

Primary Examiner — Nelson Rosario
(74) Attorney, Agent, or Firm — Young & Thompson

(57) ABSTRACT

A display device is configured to focus light for displaying an image on a position between a pupil and a retina of a user thereby to let the user see the image. Namely, the display device is a view-dependent display device. A gaze guiding unit of the display unit is configured to present information to guide gaze of the user to a guide point that is a position to which the gaze of the user is to be directed. Guiding the gaze of the user in this way makes it possible to let the user appropriately see the information presented by the display device.

6 Claims, 8 Drawing Sheets

(51) Int. Cl.
G09G 5/36 (2006.01)
G06F 3/01 (2006.01)

(56) References Cited

U.S. PATENT DOCUMENTS

2010/0097580 A1\* 4/2010 Yamamoto ........... G02B 26/101
353/69
2012/0200490 A1\* 8/2012 Inada .................... A61B 3/113
345/156
2013/0069985 A1\* 3/2013 Wong .................. G02B 27/017
345/633

FOREIGN PATENT DOCUMENTS

| JP | 2005-346177 | 12/2005 |
|----|-------------|---------|
| JP | 2008-083289 | 4/2008  |

\* cited by examiner

DISPLAY DEVICE, HEAD-MOUNTED DISPLAY, DISPLAY METHOD, DISPLAY PROGRAM AND STORAGE MEDIUM

TECHNICAL FIELD

The present invention relates to a technology regarding a display device letting a user see an image existing only in the gaze direction of the user.

BACKGROUND TECHNIQUE

Such a kind of technique is disclosed in Patent Reference-1, for example. Patent Reference-1 discloses a display device (hereinafter referred to as "view-dependent display device") capable of displaying an image existing only in the gaze direction of the user by setting the focus point of light for displaying the image to around the center of the eyeball. By setting the light focus point to around the center of the eyeball, a view-dependent display device can let the light beam only in the gaze direction pass through the pupil thereby to let the user see an image only existing in the gaze direction.

Patent Reference-1: Japanese Patent Application Laid-open under No. 2002-90688

DISCLOSURE OF INVENTION

Problem to be Solved by the Invention

In the case of such a view-dependent display device mentioned above, an image existing in the gaze direction can be seen while any image not existing in the gaze direction cannot be seen. Thus, in this case, it could happen that information outputted by the display device cannot be presented to the user.

The above is an example of the problem to be solved by the present invention. An object of the present invention is to provide a display device, a head-mounted display, a display method, a display program and a storage medium capable of letting a user properly see information by guiding the gaze.

Means for Solving the Problem

One invention is a display device configured to focus light for displaying an image on a position between a pupil and a retina of a user, including a gaze guiding unit configured to present information to guide gaze of the user to a guide point that is a position to which the gaze of the user is to be directed.

Another invention is a head-mounted display configured to focus light for displaying an image on a position between a pupil and a retina of a user, including a gaze guiding unit configured to present information to guide gaze of the user to a guide point that is a position to which the gaze of the user is to be directed.

Still another invention is a display method executed by a display device configured to focus light for displaying an image on a position between a pupil and a retina of a user, including a gaze guiding process which presents information to guide gaze of the user to a guide point that is a position to which the gaze of the user is to be directed.

Still another invention is a display program executed by a display device with a computer, the display device focusing light for displaying an image on a position between a pupil and a retina of a user, the display program making the computer function as: a gaze guiding unit configured to present information to guide gaze of the user to a guide point that is a position to which the gaze of the user is to be directed.

Still another invention is a storage medium storing the display program.

DETAILED DESCRIPTION OF THE PREFERRED EMBODIMENTS

Figure 1:
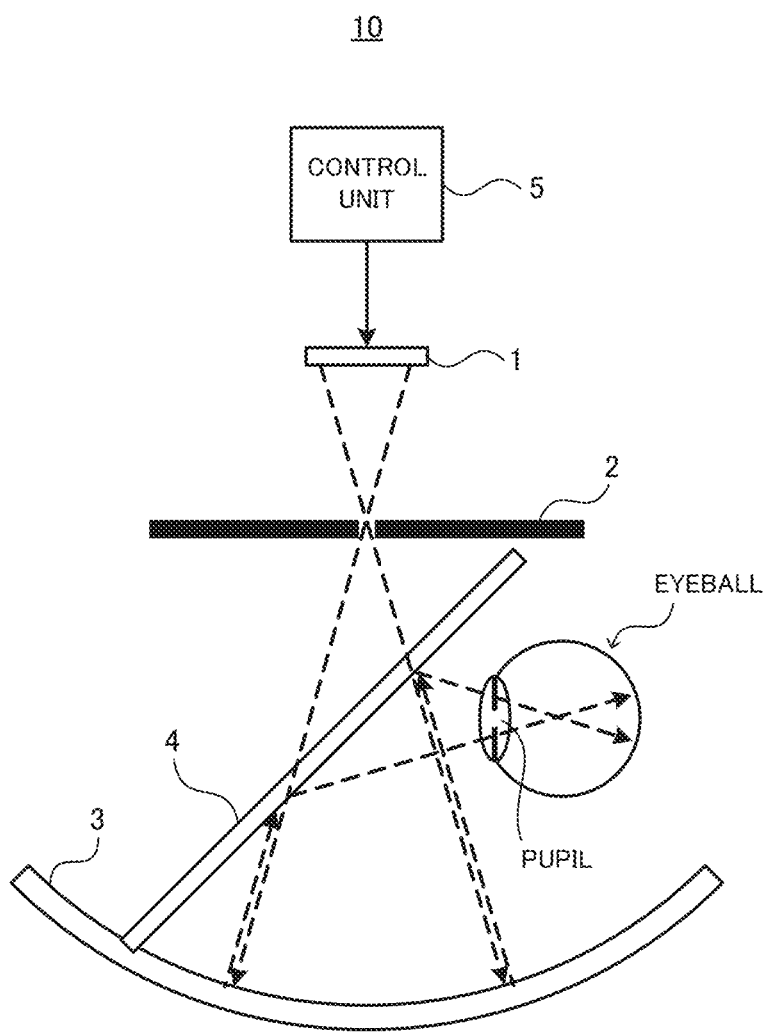
FIG. 1 illustrates an example of the configuration of a head-mounted display (HMD).

According to one aspect of the present invention, there is provided a display device configured to focus light for displaying an image on a position between a pupil and a retina of a user, including a gaze guiding unit configured to present information to guide gaze of the user to a guide point that is a position to which the gaze of the user is to be directed.

The above-mentioned display device is configured to focus light for displaying an image on a position between a pupil and a retina of a user thereby to let the user see the image. Namely, the display device is a view-dependent display device. Generally, in case of such a view-dependent display device, the user could possibly miss the information presented by the device since any image not corresponding to the gaze direction is invisible to the user. Considering the above fact, the gaze guiding unit presents information in order to guide gaze of the user to a guide point that is a position to which the gaze of the user is to be directed. Examples of the guide point include a position corresponding to an image to be presented to the user by the display device. The above-mentioned display device can let the user properly see the information presented by the display device by guiding the gaze of the user.

In one mode of the display device, the gaze guiding unit displays a guide image for guiding the gaze of the user to the guide point.

In a preferable mode of the display device, the gaze guiding unit displays, as the guide image, an image shrinking with time toward the guide point. This makes it possible to properly guide the gaze of the user regardless of the area seen by the user.

Preferably, the gaze guiding unit decreases the size of the gaze image from an initial size of the gaze image, the initial size being set in accordance with a distance between the guide point and the edge position farthest from the guide point in a display area of the display device. Thereby, it is possible to produce the effect of the gaze guide regardless of the gaze direction and to suppress the deterioration of the time efficiency of the gaze guide.

In a preferable mode of the display device, the gaze guiding unit displays, as the guide image, an image with a spatial variation depending on a distance to the guide point. This makes it possible to properly guide the gaze of the user regardless of the area seen by the user.

In a preferable example, the spatial variation is a luminance variation in accordance with the distance to the guide point. In another preferable example, the spatial variation is a color variation in accordance with the distance to the guide point. In still another preferable example, the spatial variation is a variation of density in the image in accordance with the distance to the guide point. Examples of the variation of the density in the image include a variation of density of line segments and a variation of density of points.

In a preferable mode of the display device, the gaze guiding unit displays, as the guide image, an image indicating the direction of the guide point. This makes it possible to properly guide the gaze of the user regardless of the area seen by the user.

In another mode of the display device, the display device further includes a gaze detecting unit configured to detect the gaze of the user, and the gaze guiding unit displays the guide image only on an area in accordance with the gaze detected by the gaze detecting unit. Thereby, it is possible to display such a guide image that the user can easily see it based on the gaze direction.

In another mode of the display device, the gaze guiding unit does not display the guide image on a first area corresponding to an area visually recognized at a time when the gaze is directed to the guide point. In this case, when the user directs the gaze to the guide point, the guide image comes to disappear. Thus, preferably, it is possible to suppress discomfort feeling of the user.

Preferably, the gaze guiding unit changes the size of the first area based on brightness around the user or the size of the pupil of the user. This is based on a fact that pupil diameter depends on the brightness (brightness of environment light) around the user and the size of the visible area defining the first area varies depending on the pupil diameter.

In another mode of the display device, the gaze guiding unit displays, in a second area surrounding the first area, such a guide image that an effect of the gaze guide at a position in the second area of the guide image decreases as the position is close to the first area. For example, the gaze guiding unit decreases the luminance at a position in the second area of the guide image as the position is close to the first area. Thereby, it is possible to properly deal with the variation of the visible area caused by the variation of the pupil diameter due to the brightness of the environment light.

In still another mode of the display device, the display device further includes a movement detecting unit configured to detect movement of the head of the user, and the gaze guiding unit stops displaying the guide image at a time when a predetermined time has passed since the movement detecting unit detects movement of the head toward the guide point. In this case, the guide image comes to disappear when the user directs the face to the direction of the guide point. Thus, it is possible to properly suppress discomfort of the user.

In still another mode of the display device, the display device further includes a gaze detecting unit configured to detect the gaze of the user, and the gaze guiding unit stops displaying the guide image at a time when the gaze detecting unit detects the gaze that are directed to the guide point. In this case, the guide image comes to disappear when the user directs the face to the direction of the guide point. Thus, it is possible to properly suppress discomfort of the user.

In still another mode of the display device, the gaze guiding unit displays the guide image on the whole display area of the display device. Thereby, it is possible to produce the effect of the gaze guide in the display area regardless of the gaze direction.

In still another mode of the display device, the gaze guiding unit displays the guide image on a part of the display area of the display device. Thereby, for example, it is possible to hide the guide image indicating information in which the user is not interested. Thus, presentation of information unnecessary for the user can be possibly suppressed.

Preferably, the gaze guiding unit displays guide images each corresponding to one of plural guide points whose positions are different from each other. Thereby, it is possible to guide the gaze of the user to information to be noted per classified space.

According to another aspect of the present invention, there is provided a head-mounted display configured to focus light for displaying an image on a position between a pupil and a retina of a user, including a gaze guiding unit configured to present information to guide gaze of the user to a guide point that is a position to which the gaze of the user is to be directed.

According to still another aspect of the present invention, there is provided a display method executed by a display device configured to focus light for displaying an image on a position between a pupil and a retina of a user, including a gaze guiding process which presents information to guide gaze of the user to a guide point that is a position to which the gaze of the user is to be directed.

According to still another aspect of the present invention, there is provided a display program executed by a display device with a computer, the display device focusing light for displaying an image on a position between a pupil and a retina of a user, the display program making the computer function as: a gaze guiding unit configured to present information to guide gaze of the user to a guide point that is a position to which the gaze of the user is to be directed.

Preferably, the display program can be treated in a state that it is stored in a storage medium.

EMBODIMENT

Now, preferred embodiments of the present invention will be described below with reference to the attached drawings.

(1) First Embodiment

First, a description will be given of the first embodiment.
(1-1) Device Configuration
FIG. 1 illustrates a schematic configuration of a head-mounted display (hereinafter referred to as "HMD") 10 according to the first embodiment. The HMD 10 mainly includes a display unit 1, a mask 2, a spherical mirror 3, a half mirror 4, and a control unit 5. The spherical mirror 3 enables the HMD 10 to display an image directly on the retina without using the lens function of the eye. For example, the HMD 10 is configured to be glasses and is used in a head-mounted state. The HMD 10 is an example of "the display device" according to the present invention.

The display unit 1 is configured of a LCD (Liquid Crystal Display), a DLP (Digital Light Processing) or an organic light emitting display, and outputs light for displaying an image. The display unit 1 may have such a configuration that it scans the light outputted from a laser light source by using a mirror.

The light outputted from the display unit 1 is masked by the mask 2, and the light passing through the mask 2 is reflected by the spherical mirror 3 and the half mirror 4 to reach the eyeball. In this case, the diffused light passing the mask 2 is focused onto the position at or near the center of the eyeball. The HMD 10 in the embodiment is designed to focus the light for displaying an image onto the position at or near the center of each eyeball. Accordingly, only light in the gaze direction passes through the pupil, and therefore only an image (technically, a virtual image, the same is applied hereinafter) displayed in the gaze direction is visually recognized by the user. Namely, the HMD 10 functions as a view-dependent display device. The details of the functions and the effects of a view-dependent display device are described in Patent Reference-1, for example.

The control unit 5 includes a CPU, a RAM and a ROM, and is configured to control the entire HMD 10. As described later, the control unit 5 is an example of "the gaze guiding unit" according to the present invention.

It is noted that focusing the light for displaying an image onto the position at or near the center of the eyeball is merely an example. Focusing the light onto a position between the pupil and the retina other than the position at or near the center of the eyeball is also sufficient to achieve the abovementioned view-dependent display device.

In FIG. 1, the device with the spherical mirror 3 is illustrated as a view-dependent display device. Instead, the present invention can also be applied to various kinds of devices such as a device with a lens instead of the spherical mirror 3, and a device which uses the reflecting property of a hologram element.

Figure 2:
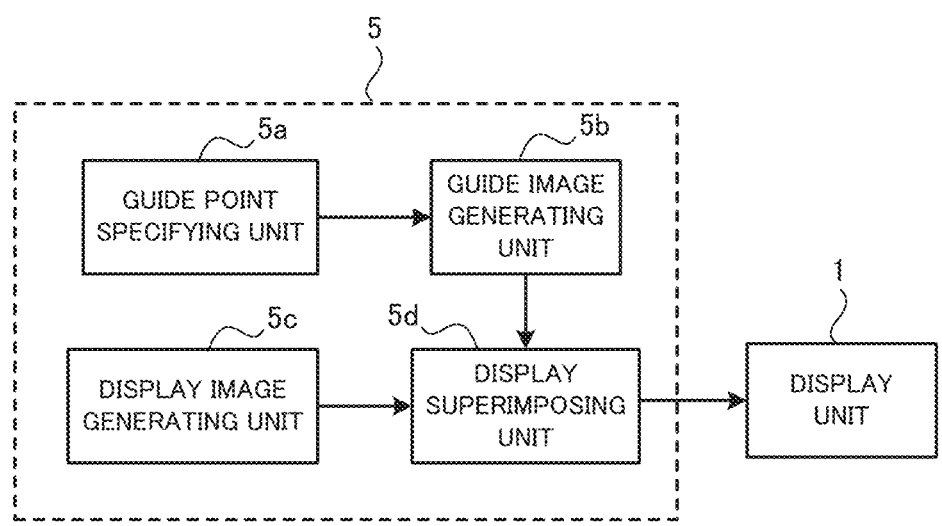
FIG. 2 is a block diagram illustrating the configuration of a control unit.

A description will be given of a concrete configuration of the control unit 5 according to the first embodiment with reference to FIG. 2. FIG. 2 is a block diagram illustrating the configuration of the control unit 5 according to the first embodiment. As illustrated in FIG. 2, the control unit 5 includes a guide point specifying unit 5a, a guide image generating unit 5b, a display image generating unit 5c and a display superimposing unit 5d. In the embodiment, the control unit 5 performs a control of displaying a guide image for guiding the gaze of the user to a guide point that is a position to which the gaze is to be directed.

The guide point specifying unit 5a specifies a point (guide point) to which the gaze is to be directed. For example, the guide point specifying unit 5a specifies the position corresponding to the image to be presented to the user by the HMD 10 as the guide point.

The guide image generating unit 5b generates a guide image for guiding the gaze of the user to the guide point. The concrete example of the guide image will be described later.

The display image generating unit 5c generates an image (an image unrelated to the guide image) to be presented to the user by the HMD 10. For example, the display image generating unit 5c generates an image generated by CG (computer graphics) or an image indicating character(s).

The display superimposing unit 5d superimposes the guide image generated by the guide image generating unit 5b on the image generated by the display image generating unit 5c, and outputs the data of the composite image to the display unit 1.

(1-2) Problems of Prior Art

A description will be given of the problems of a conventional view-dependent display device (e.g., a device described in Patent Reference-1) with reference to FIGS. 3A to 3B. Each of the rectangular areas illustrated in FIGS. 3A and 3B (as in the following drawings) corresponds to a display area of the view-dependent display device. In this example, the email notification (see the reference number 21) is displayed at the center of the display area and the present time (see the reference number 22) is displayed on the right top side of the display area. Each of the reference numbers 20a and 20b indicates a visible area corresponding to the eyesight based on the gaze direction of the user.

Figure 3A:
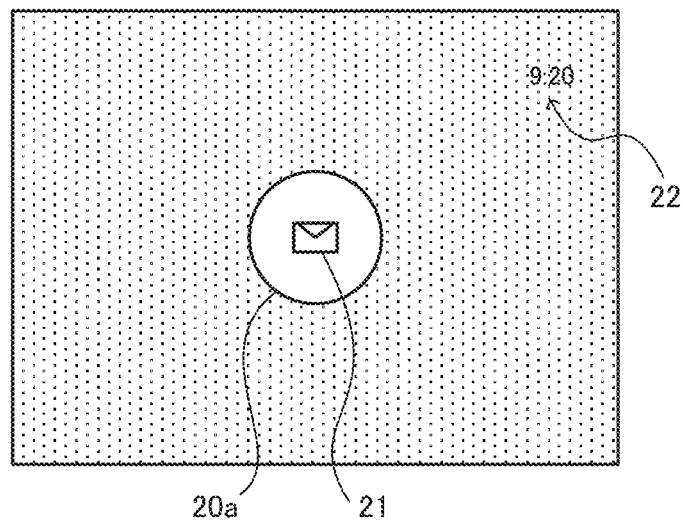
FIGS. 3A and 3B are drawings for explaining problems of a conventional view-dependent display device.
Figure 3B:
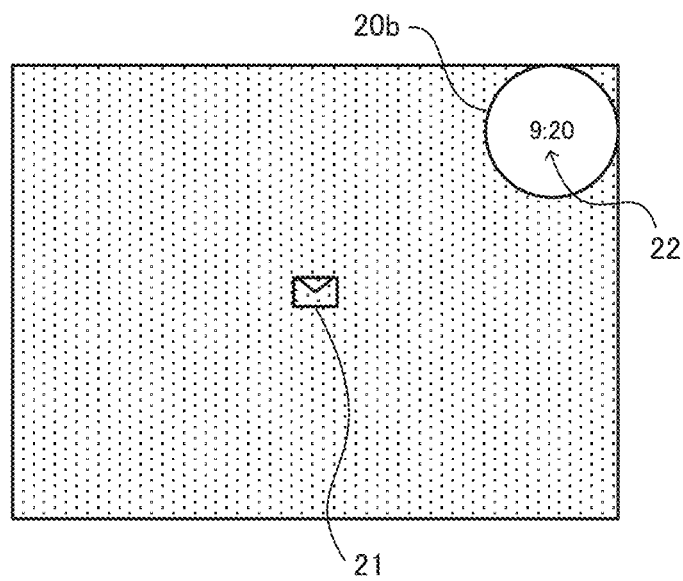

As illustrated in FIG. 3A, when the user turns the gaze on the center, the user notices the email notification. However, when the user turns the gaze on the top right in order to see the time as illustrated in FIG. 3B, the user does not notice the email notification displayed at the center. In this moment, even if the email notification is highlighted by blinking it, the user cannot notice the email notification because the highlighted notification is lost to the user's view.

As mentioned above, the conventional view-dependent display device has such a disadvantage that the user cannot see an image which does not exist in the gaze direction and that the user tends to miss the information displayed by the view-dependent display device. Considering the above facts, the HMD 10 according to the first embodiment sets a guide point to the position of an image to be presented to the user and displays the guide image for guiding the gaze of the user to the guide point.

(1-3) Display Example

Next, concrete examples of the guide image according to the first embodiment will be described. It is noted that the guide image is generated by the guide image generating unit 5b of the control unit 5.

(1-3-1) First Display Example

A description will be given of the first display example of the guide image with reference to FIGS. 4A to 4D. In FIGS. 4A to 4D, there are illustrated the stars 23 indicating a guide point, thick lines 24 (24a to 24d) indicating a guide image, and multiple fine lines indicating a trajectory of the guide image 24. Concretely, FIGS. 4A to 4D indicates a time variation of the guide image 24. In this case, time passes according to the order of FIG. 4A, FIG. 4B, FIG. 4C, and FIG. 4D.

It is noted that each star indicating the guide point 23 in FIGS. 4A to 4D is illustrated for the sake of explanation, and it is not displayed in reality (the image generated by the display image generating unit 5c is displayed instead). Additionally, the multiple fine lines indicating a trajectory of the guide image 24 are illustrated for the sake of explanation, and they are not displayed in reality. Regarding the stars and the fine lines, the same explanation is applied to the drawings mentioned later.

According to the first display image, as illustrated in FIGS. 4A to 4D, the HMD 10 displays, as the guide image 24, an image indicating a circle (i.e., an image indicating curve line (circumference or circular arc) constituting a circle, hereinafter referred to as "shrinking circle") which shrinks with time toward the guide point. Namely, the HMD 10 displays the shrinking circle whose size decreases with time and whose convergent point is the guide point 23.

Displaying such a shrinking circle can lead to proper guide of the gaze of the user regardless of an area which the user can see in the display area. Thereby, intentional information presentation to the user and guide of the gaze of the user can be achieved.

Figure 4A:
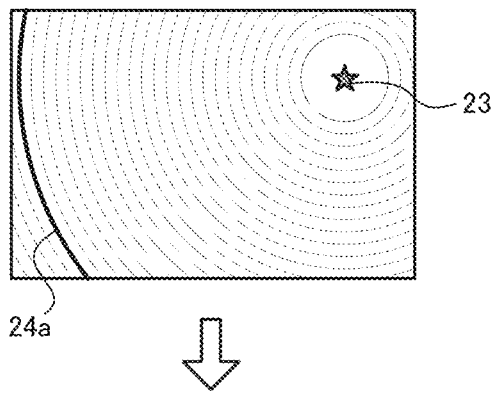
FIGS. 4A to 4D illustrate a first display example of a guide image.
Figure 4B:
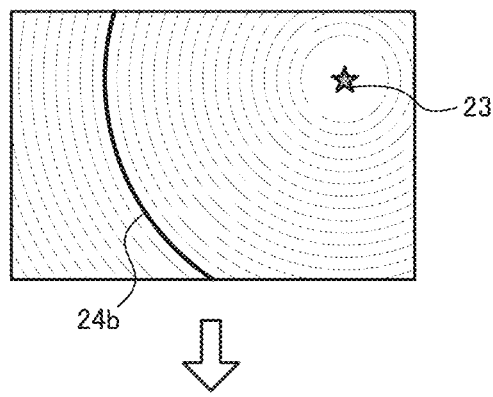
Figure 4C:
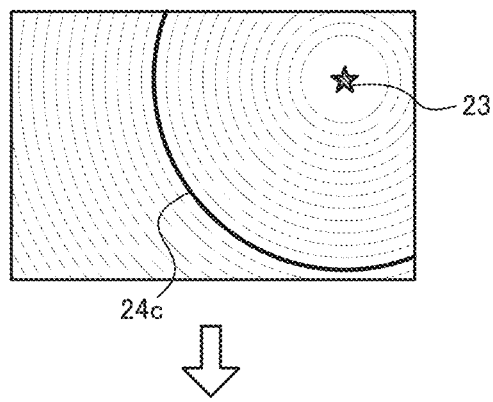
Figure 4D:
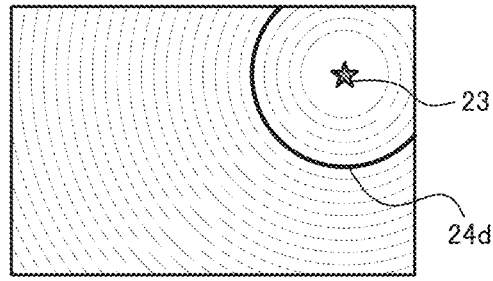

Additionally, according to the first display example, the HMD 10 starts to display the shrinking circle from the position of the edge of the display area. Concretely, the HMD 10 displays the shrinking circle whose radius gradually decreases from an initial radius. Here, the HMD 10 sets the initial radius to the distance between the guide point 23 and the position in the display area (left bottom position in FIGS. 4A to 4D) farthest from the guide point 23. The adequacy of the initial radius will be given below. If the initial radius of the shrinking circle were set to the shrinking radius as illustrated in FIG. 4B, the shrinking circle would not be displayed at the bottom left edge and no effect of the gaze guide were obtained in the case that the gaze of the user is directed to the edge. If the initial radius were too large, it could cause an interval that the shrinking circle is not displayed and lead to deterioration of the time efficiency of the gaze guide. Thus, the HMD 10 sets the initial radius as the distance between the guide point 23 and the edge position farthest from the guide point 23. Accordingly, it is possible to produce the gaze guide effect regardless of the gaze direction and to suppress the deterioration of the time efficiency of the gaze guide.

Provided that the shrinking speed of the shrinking circle is defined as "$\delta r/\delta t$" (r is the radius of the shrinking circle, and t is time), the HMD 10 keeps the shrinking speed approximately constant, for example. Thereby, it is possible to generate the same effect of the gaze guide in the whole display area. If the shrinking speed were too fast, the user could not follow the shrinking circle. In contrast, if the shrinking speed were too slow, the gaze guide could take too much time. Thus, preferably, the shrinking speed is set in consideration of the above facts. Concretely, it is preferred to set the shrinking speed so that the user can follow the shrinking circle and the time efficiency of the gaze guide can be maintained. In another example, in such an area that does not need the effect of the gaze guide, the HMD 10 may raise the shrinking speed of the shrinking circle. Thereby, it is possible to raise the time efficiency of the gaze guide.

Furthermore, the HMD 10 may repeat the display of the shrinking circle. Concretely, after having the shrinking circle converged (the shrinking circle has vanished at the moment), the HMD 10 redisplays the shrinking circle with the initial radius and shrinks it. The HMD 10 repeats the above-mentioned process. Thereby, even if there is a moment that the user distracts attention from the shrinking circle due to his/her blinking, the HMD 10 can properly guide the gaze of the user to the guide point 23.

In the above explanation, as the first display example of the guide image, the example that a circle image (shrinking circle) is shrunk is illustrated. However, the shape of the shrinking image is not limited to a circle. For example, an image indicating any shape such as a rectangle, a star, and a character may be shrunk toward the guide point 23. The shrinking speed of the shrinking circle can be also applied even to the case. For example, the shrinking speed can be defined as the speed variation of the radius of a circle circumscribed to the image to be shrunk.

(1-3-2) Second Display Example

According to the first display example, an image varying with time in the display area is displayed as the guide image. In contrast, according to the second display example, an image with a spatial variation in the display area is displayed as the guide image. Concretely, in the second display example, an image with a spatial variation depending on the distance to the guide point 23 is displayed as the guide image.

Figure 5:
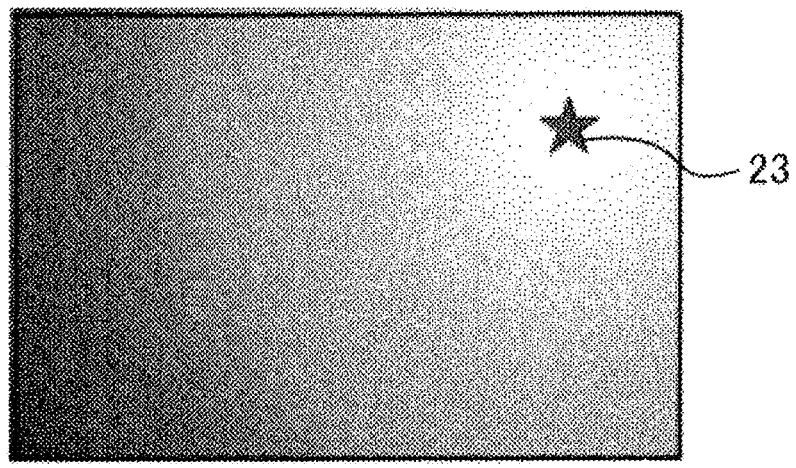
FIG. 5 illustrates a second display example of a guide image.

FIG. 5 illustrates the second display example of the guide image. As illustrated in FIG. 5, in the second display example, the HMD 10 displays, as the guide image, an image whose luminance varies toward the guide point 23. The image is configured so that the closer a position in the image is to the guide point 23, the higher the luminance at the position is, i.e., the farther a position in the image is from the guide point 23, the lower the luminance at the position is.

It is noted that the second display example is not limited to the example that an image whose luminance varies toward the guide point 23 is displayed as the guide image. Instead, an image whose color varies toward the guide point 23 may be displayed as the guide image. For example, the HMD 10 may display such an image that the degree of yellow increases as the position thereof is close to the guide point 23 while the degree of blue increases as the position thereof is far from the guide point 23.

(1-3-3) Third Display Example

According to the third display example, as with the second display example, an image with a spatial variation in the display area is displayed as the guide image. According to the third display example, an image whose line-segment density varies toward the guide point 23 is displayed as the guide image whereas an image whose luminance or color varies toward the guide point 23 is displayed as the guide image according to the second display example.

Figure 6:
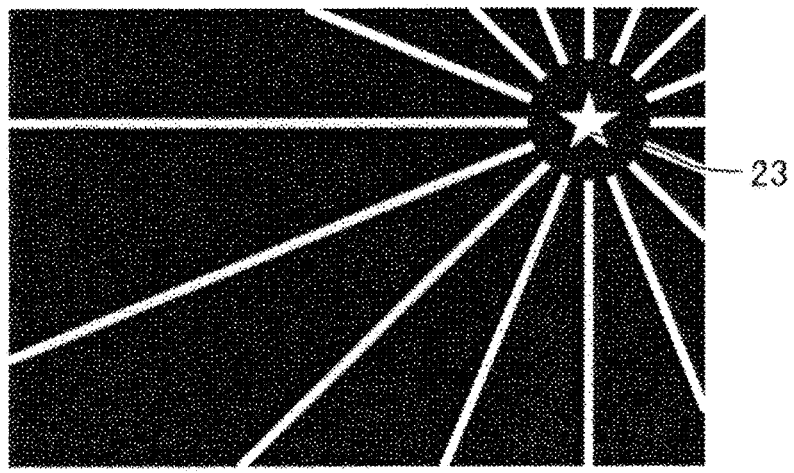
FIG. 6 illustrates a third display example of a guide image.

FIG. 6 illustrates the third display example of the guide image. As illustrated in FIG. 6, according to the third display example, the HMD 10 displays, as the guide image, an image whose line-segment density varies toward the guide point 23. The guide image indicates line segments which radiate from the guide point 23. In the image, the density of the line segments becomes high as the position thereof is close to the guide point 23 while the density of the line segments becomes small as the position thereof is far from the guide point 23.

In FIG. 6, for the sake of explanation, only a part of the line segments constituting the guide image are shown, but more line segments are displayed in reality. For example, the number of the line segments constituting the guide image is determined so that at least one line segment can be seen regardless of the gaze direction.

The third display example is not limited to the example that an image whose line-segment density varies toward the guide point 23 is displayed as the guide image. Instead, an image whose point density varies toward the guide point 23 may be displayed as the guide image. For example, it is possible to display such an image that the point density becomes high as the position thereof is close to the guide point 23 while the point density becomes small as the position thereof is far from the guide point 23. In this case, the relationship between the distance from the guide point 23 and the point density may be switched.

(1-3-4) Fourth Display Example

The fourth display example is different from the first to the third display examples in that an image indicating the direction of the guide point 23 is displayed as the guide image. Concretely, according to the fourth display example, arrowed-line images each indicating the direction of the guide point 23 are displayed as the guide image.

Figure 7:
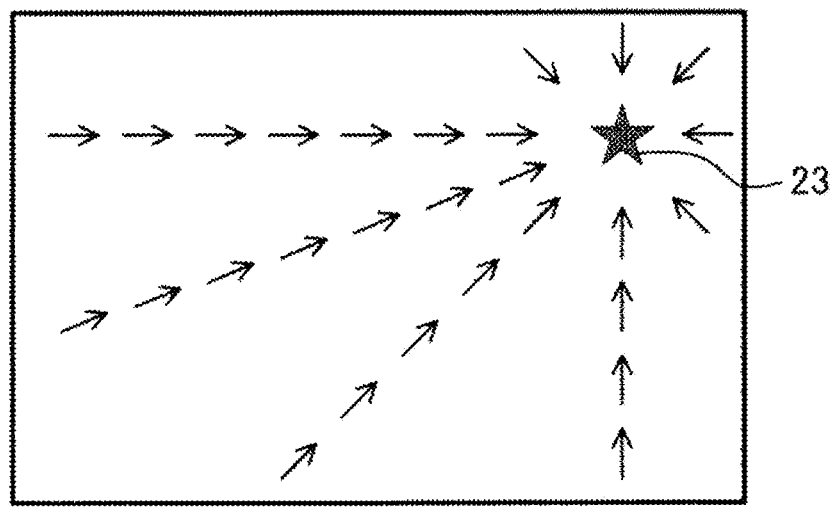
FIG. 7 illustrates a fourth display example of a guide image.

FIG. 7 illustrates the fourth display example of the guide image. As illustrated in FIG. 7, according to the fourth display example, the HMD 10 displays, as the guide image, multiple arrowed-line images each indicating the direction of the guide point 23. The multiple arrowed-line images radiate from the guide point 23.

In FIG. 7, for the sake of explanation, only a part of the arrowed-line images constituting the guide image are shown, but more arrowed-line images could be displayed in reality. For example, the number of the arrowed-line images constituting the guide image is determined so that at least one arrowed-line image can be seen regardless of the gaze direction.

(1-3-5) Fifth Display Example

According to the first display example, an image with a time variation in the display area is displayed as the guide image, and according to the second to the fourth display examples, an image with a spatial variation in the display area is displayed as the guide image. In contrast, according the fifth display example, an image based on the first display example in combination with at least one of the second to the fourth display examples, i.e., an image with a time variation and a spatial variation in the display area is displayed as the guide image.

(1-3-6) Other Display Examples

According to the above-mentioned display examples, the guide image is displayed on the basis of one guide point. Instead, guide images each corresponding to each of multiple guide points may be displayed. Namely, the above-mentioned display examples can also be applied to a case of guiding the gaze to multiple points. For example, circle images (shrinking circle) each shrinking toward each of the multiple guide points are displayed at the same time. In another example, the target guide point is switched per constant time or per one period and on the basis of the target guide point as of the moment, the guide image is displayed. Namely, a time division display may be performed. In still another example, each guide image is displayed on each of areas into which the display area is divided in the vertical and/or the horizontal direction. Namely, a spatial division display may be performed.

(1-4) Limitation of Display Area of Guide Image

Any guide image described above may be displayed on only a visible area in accordance with the gaze direction of the user instead of the whole display area. Concretely, the guide image can be displayed only on the visible area based on the gaze direction detected by means of any known method. Accordingly, it is possible to display the guide image which is displayed on the center of gaze direction and which is easy for the user to visually recognize. For example, arrowed-line image(s) indicated by the fourth display example may be displayed on the center of the gaze direction of the user. This enables the user to easily perceive the direction indicated by the arrowed-line image(s).

(1-5) End of Gaze Guide

Generally, the above-mentioned gaze guide becomes unnecessary once the gaze of the user has been directed to the guide point 23. If the guide image is displayed after the gaze has been directed to the guide point 23, it could cause the user to feel discomfort. Thus, it is preferred to end the display of the guide image (i.e., stop the gaze guide) once the gaze of the user has been directed to the guide point 23. A concrete description will be given of the end of the gaze guide.

It is noted that the following concrete examples regarding the end of the gaze guide are to be applied to such a guide image as indicated in the first to the fourth display examples.

(1-5-1) First Example

Figure 8:
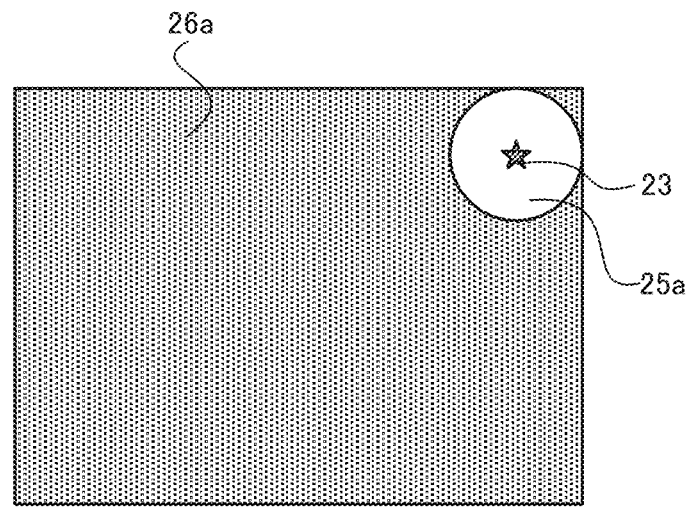
FIG. 8 illustrates a first example of terminating the gaze guide.

A description will be given of the first example regarding the end of the gaze guide with reference to FIG. 8. In FIG. 8, the area 25*a* in the display area is an area where the guide image is not supposed to be displayed, and the area 26*a* is an area where the guide image is supposed to be displayed. The area 25*a* corresponds to the visible area at the time of the gaze being directed to the guide point 23. It is noted that the area 25*a* is an example of "the first area" according to the present invention.

As illustrated in FIG. 8, according to the first example, the HMD 10 does not display the guide image on the area 25*a* which corresponds to the visible area at the time when the gaze of the user coincides with the guide point 23. Accordingly, as soon as the user has shifted the gaze to the guide point 23, the guide image becomes invisible, i.e., the display of the guide image terminates. Thus, in this case, it is possible to properly suppress discomfort feeling of the user. In contrast, when the gaze of the user is not directed to the guide point 23, it is possible to properly guide the gaze by letting the user visually recognize the guide image.

It is noted that the size of the area 25*a* where the guide image is not supposed to be displayed may be changed depending on the pupil diameter. This is because the size of the visible area defining the area 25*a* depends on the pupil diameter. For example, the HMD 10 detects the pupil diameter of the user by means of any known method and estimates the visible area based on the detected pupil diameter. Thereby, the HMD 10 can set the size of the area 25*a* based on the estimated visible area.

Additionally, the pupil diameter depends on the brightness of the environment light (the brightness around the user). Thus, the size of the area 25*a* where the guide image is not supposed to be displayed may be changed on the basis of the brightness of the environment light instead of directly using the pupil diameter as described above. For example, the HMD 10 detects the brightness of the environment light and estimates the visible area corresponding to the pupil diameter based on the detected brightness. Thereby, the HMD 10 can set the size of the area 25*a* based on the estimated visible area.

(1-5-2) Second Example

In consideration of the variation of the visible area depending on the variation of the pupil diameter in accordance with the brightness of the environment light, the second example is different from the first example in that the HMD 10 displays the guide image whose gaze guide effect is gradually lowered in the area (hereinafter referred to as "buffer area") surrounding the area where the guide image is not supposed to be displayed. Namely, according to the first example, by defining the area 25*a* where the guide image is not supposed to be displayed and the area 26*a* where the guide image is supposed to be displayed, the HMD 10 determines whether or not to display the guide image. In contrast, according to the second example, by defining the buffer are a provided between the area where the guide image is not supposed to be displayed and the area where the guide image is supposed to be displayed, the HMD 10 gradually changes the guide image from the displayed state to the non-displayed state.

Figure 9:
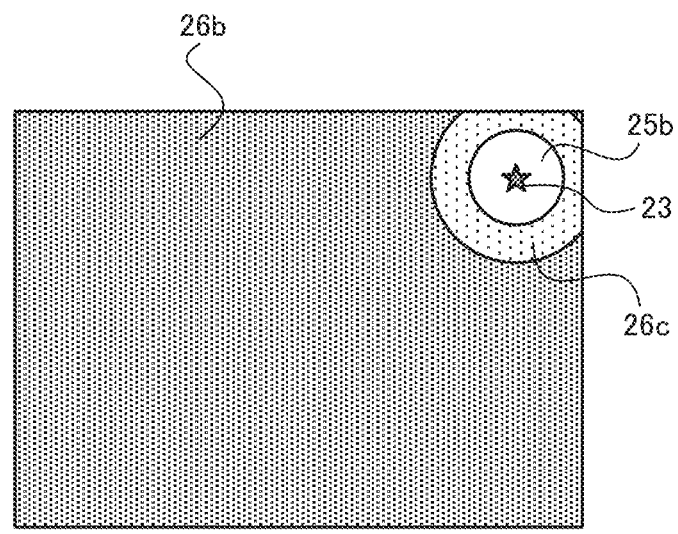
FIG. 9 illustrates a second example of terminating the gaze guide.

FIG. 9 illustrates the second example regarding the end of the gaze guide. In FIG. 9, the area 25*b* in the display area is an area where the guide image is not supposed to be displayed, and the area 26*b* is an area where the guide image is supposed to be displayed, and the area 26*c* is the above-mentioned buffer area. Concretely, in the area 26*b*, the guide image with the normal effect of the gaze guide is displayed, and in the buffer area 26c, the guide image whose effect of the gaze guide is lower than the effect of the guide image in the area 26b. The buffer area 26c is an example of "the second area" according to the present invention. The size thereof is set in accordance with the variation width of the visible area in response to the variation of the pupil diameter depending on the brightness of the environment light.

In the second example, the HMD 10 displays the guide image in the buffer area 26c so that the closer the gaze of the user is to the area 25b where the guide image is not supposed to be displayed, the lower the effect of the gaze guide gradually becomes. For example, in the buffer area 26c, the HMD 10 lowers the luminance of the guide image in comparison to the area 26b, or thins down the line segments constituting the guide image, or raises the shrinking speed of the guide image.

(1-5-3) Third Example

According to the third example, the HMD 10 terminates the display of the guide image when a predetermined time has passed after the start of the display of the guide image. The third example may be performed instead of the first and the second examples or may be performed in combination of either the first or the second example.

(1-5-4) Fourth Example

According to the fourth example, the HMD 10 terminates the display of the guide image when a predetermined time has passed since the head of the user starts to move toward the guide point 23. Concretely, in the fourth example, the HMD 10 detects the movement of the head of the user based on the output of at least one sensor such as a camera, an acceleration sensor and a gyro sensor. When the movement of the head toward the guide point 23 is detected, the HMD 10 terminates the display of the guide image in the predetermined time after the detection.

It is noted that the fourth example may be performed instead of the first to the third examples or in combination of at least one of the first to the third examples.

(1-5-5) Fifth Example

According to the fifth example, the HMD 10 terminates the display of the guide image when the gaze of the user is directed to the guide point 23. Concretely, in the fifth example, the HMD 10 detects the gaze of the user by means of a known method and terminates the display of the guide image in the case that the detected gaze is directed to the guide point 23.

It is noted that the fifth example may be performed instead of the first to the fourth examples or in combination of at least one of the first to the fourth examples.

(2) Second Embodiment

Next, a description will be given of the second embodiment. The second embodiment applies the configuration for guiding the gaze of the user to the guide point 23 as illustrated in the first embodiment to the configuration of an AR (Augment Reality) that displays additional information indicated by CG or character(s) on the real environment. Hereinafter, any configuration realizing an AR is referred to as "AR system".

According to the view-dependent display device (HMD 10) as illustrated in FIG. 1, the user can see the real environment in front of the user and the display image at the same time through the half mirror 4. Thus, by providing a unit (e.g., a camera) for detecting an object actually existing in the real environment, it can be possible to display an image in accordance with the object. Namely, the AR system can be realized.

Figure 10A:
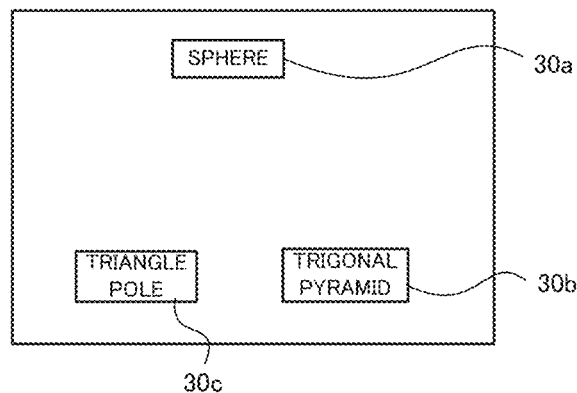
FIG. 10 is a diagram for explaining display of an AR system.
Figure 10B:
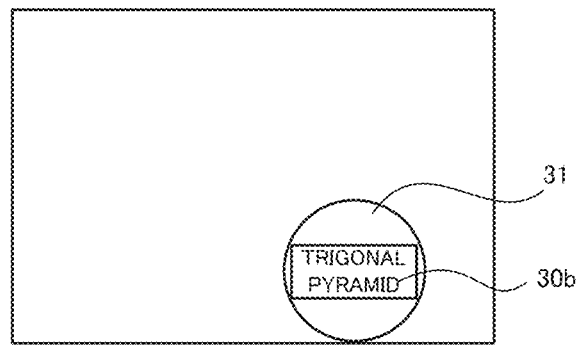
Figure 10C:
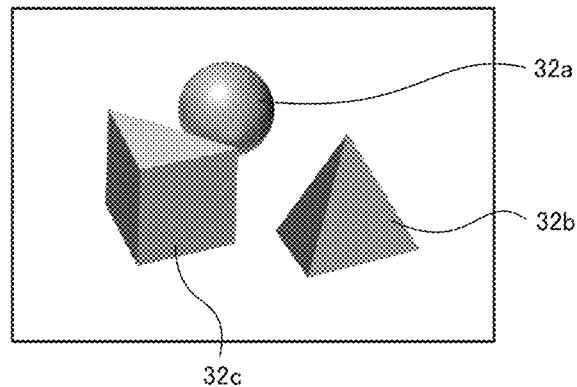
Figure 10D:
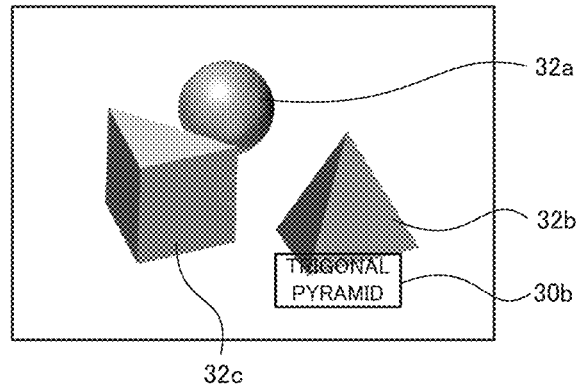

A concrete description will be given of the display of the AR system with reference to FIGS. 10A to 10D. FIG. 10A illustrates images 30a to 30c displayed by the display unit 1 of the HMD 10, and FIG. 10B illustrates the image seen in the visible area 31 in the case that the images 30a to 30c are displayed. In this case, only the image 30b is visually recognized. In contrast, FIG. 10C illustrates the objects 32a to 32c existing in the real environment, and FIG. 10D illustrates the image seen through the AR system. Concretely, FIG. 10D illustrates an image visually recognized in the visible area 31 as indicated by FIG. 10B in the case that the images 30a to 30c illustrated in FIG. 10A are displayed in the real environment illustrated in FIG. 10C. As indicated by FIG. 10D, the AR system can display the image 30b in accordance with the object 32b existing in the real environment.

Here, regarding the AR system, in the case that the view-dependent display device (HMD 10) is mounted on the head, the position of the guide point 23 on the display varies in response to the movement of the head. Hereinafter, a concrete description will be given of the gaze guide in the AR system.

(2-1) Gaze Guide in AR System

The AR system including the view-dependent display device can display information (image) at the position of the corresponding object existing in the real environment. The AR system can also make the guide point 23 coincide with the position of an object existing in the real environment. Thus, when the configuration indicated by the first embodiment (i.e., the configuration of displaying the guide image for guiding the gaze to the guide point 23) is applied to the AR system, the guide image for guiding the gaze to the guide point 23 can be displayed, wherein the guide point 23 is set to the position of an object existing in the real environment or the position of the display information (image) concerning the object. For example, the guide image indicated by the first to the fourth display examples in the first embodiment can be displayed in the same way.

(2-2) End of Gaze Guide in AR System

Regarding the AR system, the guide image also becomes unnecessary once the gaze of the user has been directed to the guide point 23. If the guide image is displayed even after the gaze is directed to the guide point 23, it could cause the user to feel discomfort. Thus, it is also preferred for the AR system to end the display of the guide image once the gaze of the user has been directed to the guide point 23.

As mentioned above, the AR system based on the view-dependent display device displays the guide image for guiding the gaze to the guide point 23 whose position is set to the position of an object existing in the real environment or the position of the display information (image) relating to the object. Generally, when paying attention to an object existing in the real environment, the user tends to direct the face to the object. Thus, when the guide point 23 associated with the position of the object existing in the real environment is shifted to around the front of the face of the user, the AR system based on the view-dependent display device determines that the gaze of the user is directed to the guide point 23 to end the display the guide image. Thereby, it is possible to achieve a proper gaze guide and suppression of any discomfort feeling of the user at the same time. For example, on the basis of an image captured by a camera which shoots the real environment in front of the user, it is possible to determine whether or not the guide point 23 associated with the position of the object is shifted to around the front of the face.

It is noted that the various kinds of methods of terminating the gaze guide described in the section "(1-5) End of Gaze Guide" can be applied to the AR system based on the view-dependent display device.

(2-3) Gaze Guide by Area

Displaying the guide image on each of plural areas into which the display area are divided in accordance with particular areas in the real environment can suppress guiding the gaze to information unnecessary for the user. Thereby, it is possible to achieve an efficient gaze guide and suppression of displaying information unnecessary for the user at the same time.

Figure 11:
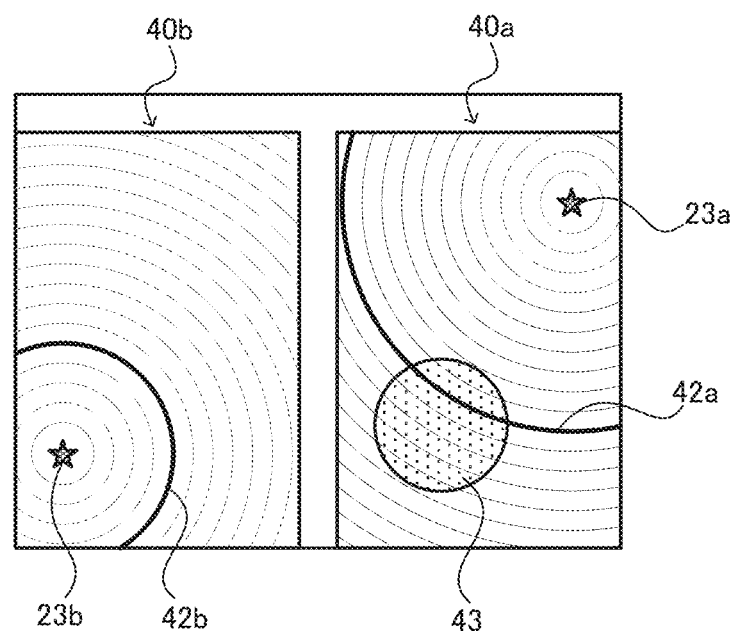
FIG. 11 is a concrete example of the gaze guide on an area-by-area basis.

FIG. 11 indicates a concrete example of the gaze guide on an area-by-area basis. FIG. 11 illustrates an example that there are provided areas 40a and 40b corresponding to the guide points 23a and 23b in the display area. On the areas 40a and 40b, there are displayed the guide images 42a and 42b each similar to the guide image indicated by the first display example in the first embodiment. Concretely, on each of the areas 40a and 40b, an image of circle (shrinking circle) shrinking with time toward the guide point 23a or 23b is displayed as the guide image 42a or 42b. It is noted that each of the guide images 42a and 42b is displayed only either the area 40a or 40b, and the guide images do not overlap with each other.

For example, the guide images 42a and 42b as shown in FIG. 11 are effectively applied to any target object and/or information to be visually recognized by the user in a space where objects are arranged by type such as a mall and a supermarket. For example, in case of a mall where a clock shop and a cloth shop are arranged, the area 40a is used for the clock shop and the guide point 23a is set to the position of any target item to be looked at by the user in the clock shop, and the area 40b is used for the cloth shop and the guide point 23b is set to the position of any target item to be looked at by the user in the cloth shop. In this case, when the user is interested in a watch and directs the gaze to the clock shop, the guide image 42a for the clock shop is visually recognized after the visible area 43 shifts within the area 40a allocated to the clock shop. Accordingly, the gaze of the user is guided to the guide point 23a for the clock shop, and the user comes to note an item overlapping with the guide point 23a. In this case, since the user cannot see the guide image 42b for the cloth shop, the gaze of the user is not guided to the guide point 23b for the cloth shop.

As mentioned above, by displaying the guide images 42a and 42b on the areas 40a and 40b respectively, it is possible to properly guide the gaze of the user to any target object and/or information to be looked at on a divided space-by-space basis without detecting the gaze. In this case, any guide image corresponding to an object and/or information in which the user is not interested cannot be seen by the user. Thus, it is possible to properly suppress the discomfort feeling of the user.

It is noted that the display indicated by FIG. 11 can be achieved by "the information on the three dimensional real environment" and "the unit detecting the positional relationship between the image and the real environment". Examples of "the information on the three dimensional real environment" include three dimensional area information on the clock shop and the cloth shop, three dimensional position of the guide point, and display information. For example, "the unit detecting the positional relationship between the image and the real environment" can be achieved by means of a capture image captured by a camera shooting the real environment in front of the user. By means of "the unit detecting the positional relationship between the image and the real environment", "the information on the three dimensional real environment" is displayed on the area-by-area basis.

Instead of the example that the guide images 42a and 42b are respectively displayed on the areas 40a and 40b in the display area, more than two guide images may be respectively displayed on more than two areas in the display area. Furthermore, instead of such an example that plural guide images are respectively displayed on plural areas in the display area, the guide image may be displayed on only one area (a part of the display area) in the display area.

(3) Modification

In the above explanation, such an embodiment that the gaze of the user is guided by use of the guide image is illustrated, but the present invention is not limited to this embodiment. In another example, the guide of the gaze may be performed by means of blinking of a LED, vibration and sound instead of the guide image. For example, the display device may be equipped with plural LEDs to blink a LED positioned at the place corresponding to the direction in which the gaze is guided. Instead, the display device may vibrate the portion of the display device corresponding to the direction to which the gaze is guided, or may output sound from the portion of the display device corresponding to the direction to which the gaze is guided.

The application of the present invention is not limited to the HMD 10. The present invention can be also applied to such a display device as a head-up display (HUD).

INDUSTRIAL APPLICABILITY

This invention can be applied to such a display device as a head-mounted display and a head-up display.

BRIEF DESCRIPTION OF REFERENCE NUMBERS

1 Display Unit
2 Mask
3 Spherical mirror
4 Half mirror
5 Control unit
5a Guide point specifying unit
5b Guide image generating unit
5c Display image generating unit
5d Display superimposing unit
10 Head-mounted display

The invention claimed is:

1. An image providing device comprising:
an image information output device configured to output image information;
an optical system configured to permit a user to visually recognize a part of an image by focusing a light that constitutes the image information onto either a center of an eyeball of the user or a position between a pupil and a retina of the user when the image providing device is mounted on a head of the user, the part of the image being associated with a gazing direction of the user; and
a controller configured to control the image information output device to provide a guide image to the user, the guide image indicating a direction that the user should gaze to visually recognize another part of the image that the user is not able to visually recognize under a current gazing direction of the user, wherein the controller does not provide the guide image when the user directs a gaze to the other part of the image that the guide image indicates.

2. The image providing device according to claim 1, wherein the guide image is an image shrinking with time toward a guide point that is a position of the other part of the image to be visually recognized.

3. The image providing device according to claim 1, wherein the optical system includes a spherical mirror and a half mirror, and wherein the half mirror reflects the light focused by the spherical mirror towards either the center of the eyeball or the position between the pupil and the retina.

4. An image providing device comprising:

an image information output device configured to output image information;

an optical system configured to permit a user to visually recognize a part of an image by focusing a light that constitutes the image information onto either a center of an eyeball of the user or a position between a pupil and a retina of the user when the image providing device is mounted on a head of the user, the part of the image being associated with a gazing direction of the user; and a controller configured to control the image information output device to provide a guide image to the user, the guide image indicating a direction that the user should gaze to visually recognize another part of the image that the user is not able to visually recognize under a current gazing direction of the user, wherein the guide image is an image with a spatial variation depending on a distance to a guide point that is a position of the other part of the image to be visually recognized.

5. The image providing device according to claim 4, wherein the guide image is an image shrinking with time toward a guide point that is a position of the other part of the image to be visually recognized.

6. The image providing device according to claim 4, wherein the optical system includes a spherical mirror and a half mirror, and wherein the half mirror reflects the light focused by the spherical mirror towards either the center of the eyeball or the position between the pupil and the retina.

* * * * *